M. SMITHEY.

METER.

APPLICATION FILED JULY 13, 1917.

Reissued Feb. 1, 1921.

15,036.

2 SHEETS—SHEET 1.

Inventor

Marm Smithey

By Chas. F. Williamson

Attorney

M. SMITHEY.

METER.

APPLICATION FILED JULY 13, 1917.

Reissued Feb. 1, 1921. 15,036.

2 SHEETS—SHEET 2.

Inventor

Marvin Smithey

By Chas. F. Williamson

Attorney

UNITED STATES PATENT OFFICE.

MARVIN SMITHEY, OF LAWRENCEVILLE, VIRGINIA.

METER.

15,036. Specification of Reissued Letters Patent. Reissued Feb. 1, 1921.

Original No. 1,199,626, dated September 26, 1916, Serial No. 72,794, filed January 18, 1916. Application for reissue filed July 13, 1917. Serial No. 180,442.

*To all whom it may concern:*

Be it known that I, MARVIN SMITHEY, a citizen of the United States, and resident of Lawrenceville, in the county of Brunswick and State of Virginia, have invented a certain new and useful Improvement in Meters, and do hereby declare that the following is a full, clear, and exact description thereof.

My invention is an improvement in meters, and the invention has for its object to provide a meter for use with motor vehicles, wherein a supporting casing is provided in which is mounted a speedometer and a series of odometers, arranged in series with their axes parallel, the casing having a reading opening for each odometer, together with a common driving means for all of the odometers for operating them in synchronism, and wherein each odometer is provided with means extending outside of the casing for permitting the particular odometer to be disconnected from the operating means and to be reset, and wherein adjacent to each reading opening a legend is arranged, identifying the particular odometer within certain essential operating elements of the vehicle, and with certain essential operations to be performed about the vehicle.

Figure 1:
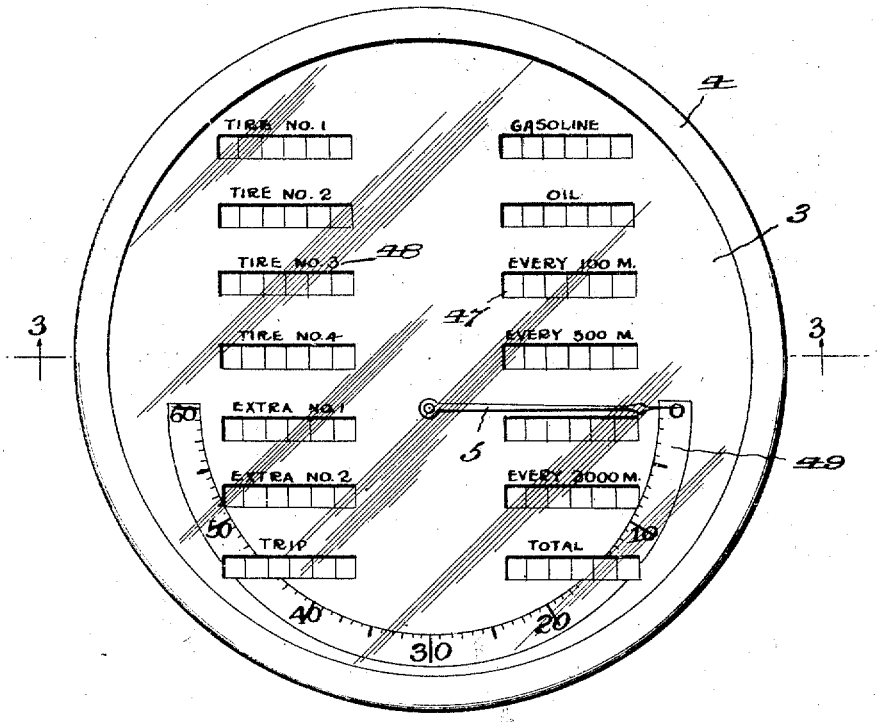
Figure 4:
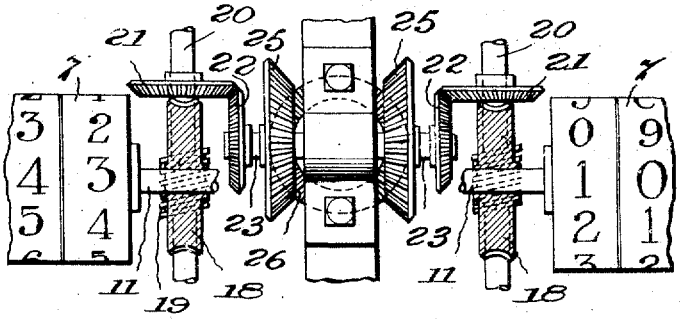
Figure 2:
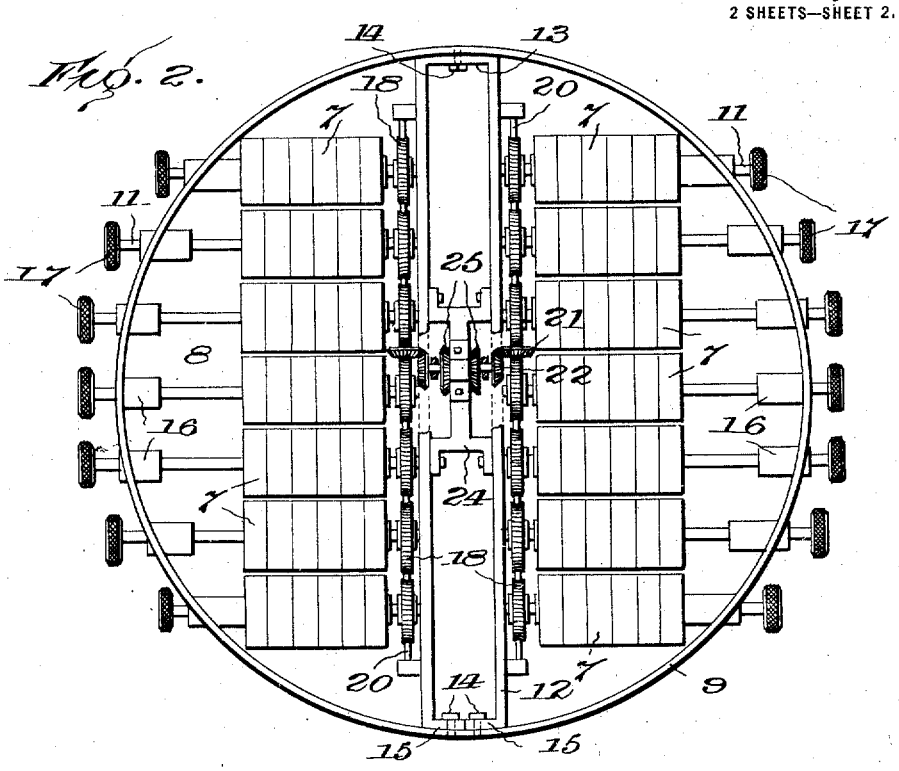
Figure 3:
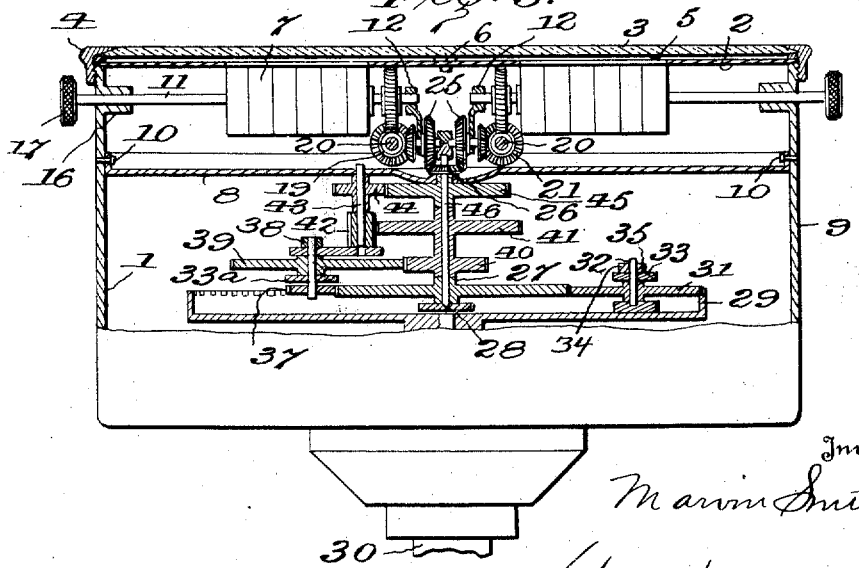

In the drawings; Figure 1 is a face view of the improved meter; Fig. 2 is a section on the line 2—2 of Fig. 3; Fig. 3 is a section on the line 3—3 of Fig. 1, and Fig. 4 is an enlarged detail view, partly in section, through the operating mechanism for the speedometer.

In the present embodiment of the invention, a casing is provided consisting of a cup-shaped body 1, externally threaded at its upper end, and a cover plate 2, resting on the upper edge of the side wall of the body, and covered by a disk 3 of transparent material, as for instance, glass, the disk and the plate 2 being held in place on the body by means of a bezel ring 4 which has the threaded engagement with the body.

A speedometer of ordinary construction is arranged within the body of the casing, near the bottom thereof, the particular construction of the speedometer forming no part of the present invention, and for that reason not shown, and the speedometer is connected to an indicating hand 5, arranged on the upper surface of the plate 2, between the same and the disk 3 of transparent material. The hand or indicator 5 is connected with the upper end of shaft 6, which is operated by the operating mechanism arranged within the body.

A number of odometers 7, fourteen in the present instance are mounted in the casing between the plate 2 and a partition plate 8, which is provided with a marginal flange 9 fitting the inner face of the body 1 of the casing and secured thereto by means of screws 10 passing through the flange and engaging the body.

Each odometer consists of a series of number wheels, mounted upon a shaft 11, which is journaled at its inner end in one of the arms 12 of a substantially U-shaped bracket, consisting of the said arms and a body 13. The bracket is arranged diametrically of the casing, and secured to the side wall of the body by means of screws 14, which are passed through the body and through angular lugs 15 at the ends of the arms remote from the body. Thus the arms 12 of the body are held parallel with each other, and with a diameter of the casing.

At their outer ends the shafts extend through the side wall of the casing, and are journaled in bearings 16 connected with the side wall and extending on opposite sides of the same, and each shaft 11 is provided with a resetting knob or head 17 outside of the casing.

The shafts 11 are connected to the number wheels of the odometers in any usual or desired manner, and in such manner that by turning the shaft the said wheels may be disconnected from the shaft and may be reset at zero by means of the shaft.

A worm wheel 18 is secured to the inner end of each shaft, between the series of number wheels and the adjacent arm 12 of the bracket, and each worm wheel meshes with a worm 19 on a worm shaft 20, extending parallel with the adjacent arm 12 of the bracket below the same.

Each worm shaft is provided with a bevel gear 21 intermediate its ends, and each of the bevel gears meshes with a similar gear 22 on a stub shaft 23, which is journaled in an H-shaped bearing bracket 24 secured between the arm 12 of the bracket 12—13.

Each of the stub shafts is provided with a second bevel gear 25 at its inner end, and these gears 25 mesh with a bevel gear 26 on the upper end of a shaft journaled in the partition 8. The shaft above mentioned is in alinement with a shaft 27 journaled at its lower end in a step bearing 28 at the axis of a crown gear 29, which is driven by a flexible shaft 30 extending through the head of the body of the casing at the center thereof, and adapted to be connected with one of the wheels of the vehicle to drive the shaft and the crown gear.

The teeth of the crown gear mesh with the teeth of a gear wheel 31, which is keyed to a stub shaft 32, mounted in a bearing plate 33 secured within the casing, and a collar 34 is adjustably held on the stub shaft above the bearing plate by means of a set screw 35.

The gear wheel 31 meshes with a gear wheel 36 on the shaft 27 before mentioned, and with a second gear wheel 37 on a second stub shaft 38 journaled diametrically opposite the shaft 32 in a bearing plate 33 arranged in the same manner as the plate 33.

The gear wheel 37 is keyed to the shaft below the bearing plate, and a second gear wheel 39 is keyed to the shaft above the bearing plate. This gear wheel 39, which is of larger size than the gear wheel 37, meshes with a similar gear wheel 40, on the shaft 27 above the gear wheel 36.

A gear wheel 41 is mounted on the shaft above the gear wheel 40 and is rigid therewith, the said gear wheel 41 being of larger size than the gear wheel 40. The gear wheel 41 meshes with a pinion 42 journaled on another stub shaft 43, which is journaled between the stub shaft 38 and the shaft 27, and is provided with a gear wheel 44 above the pinion, and rigid therewith, which meshes with a gear wheel 45 keyed to the stub shaft 46, which supports the bevel gear 26, the said stub shaft being journaled in the partition 8 and in alinement with the shaft 27 before mentioned.

The gear wheels 31, 36, 37, 39, 40, 41, 42, 44 and 45 constitute a speed changing gear, for driving the odometers at a proper relative speed with respect to the movement of the front wheel of the vehicle, and it will be evident that when the crown gear 29 is driven, the bevel gear 26 will be driven at a greatly reduced speed and will drive the worm shafts 19, which in turn drive the odometers in synchronism.

The plate 2 before mentioned is provided with a slot or opening 47 at each odometer for permitting the odometer to be read, and the said plate is also provided with a legend or label 48 adjacent to each opening and above the same.

In the present instance fourteen odometers are shown, but in practice there will be sixteen odometers six odometers identified with the tires, four with the tires in use and two with the two extra tires, two odometers with the oil and fuel supply, two with the packing of the differential and transmission, and two with the trip and total mileage, and the other four with certain necessary operations to be performed about the vehicle at predetermined mileages, as for instance, oiling or greasing the different parts, refilling the radiator and the like.

The legends adjacent to the odometers are identifying labels indicating the purpose of the odometers. The speedometer indicator 5 coöperates with a scale 49, arranged on the plate 2, at the lower side thereof, for indicating the speed attained by the vehicle.

In operation, the speedometer and the odometers or indicating devices are driven in synchronism from the shaft 30, and the indicator 5 will indicate the speed attained by the vehicle. When a new tire is placed the odometer pertaining to that particular tire is reset to zero, and it will be evident that the said odometer will give the mileage made by the said tire. When the tire is removed temporarily, the odometer pertaining thereto is disconnected from the shaft 30, and is permitted to remain idle until the tire is replaced.

If an extra tire is substituted for the tire removed the odometer pertaining to the extra tire will be connected with the driving shaft and the said odometer will record the mileage made by the extra tire.

As regards the four odometers devoted to signaling or indicating the necessity for performing certain operations, these odometers may if desired be provided with the indicating or signal shutters shown and described in my co-pending application, Serial No. 58,808, filed October 30, 1915.

There are certain important practical results from the arrangement of the odometers in two series along side of each other. If the fourteen odometers shown in the drawings were arranged in a single series, the instrument would be a long narrow affair, its length being something like twelve inches, a length that would be prohibitive of its use on an instrument board of an automobile; and moreover the single driving shaft would be something like twelve inches long, and as of necessity, it must be slender, trouble would arise in properly driving the series of odometers from it because of the effects of the torsional strains. Again, a long series of sight openings would be inconvenient and annoying to read. By my two-series arrangement, the length of the instrument can be one-half and the attractive looking circular form of casing may be employed, which, of course, would be out of the question with the long single series, and subdivision of the sight openings into two groups renders the picking out of any particular sight opening to read the registration thereat easy, since the eyes do not have to run over the great length of a long series. Instead of one shaft to drive all the odometers, there may be a comparatively short shaft for each of the two series receiving motion from a common driving mechanism which can be made of the necessary weight and strength without objectionable results. Other advantages which will be perceived by those skilled in the art come from my two-series arrangement, but I have mentioned enough to show its great utility and advantages.

I claim—

1. A meter comprising a cylindrical casing, a U-shaped bracket disposed within the casing, and secured at its opposite ends to the walls of the casing, said bracket having laterally extending bearing lugs on each side thereof, a power shaft disposed on each side of said bracket in said bearing lugs and provided with a series of gears, a plurality of odometers disposed within the casing on each side of said bracket, the shafts of the odometers being parallel and at right angles to the power shafts and a gear wheel carried by the shaft of each odometer and arranged to engage its corresponding gear on each of the power shafts.

2. A meter comprising a cylindrical casing, a U-shaped bracket disposed within the casing and secured at its opposite ends to the walls of the casing, said bracket having laterally extending bearing lugs on each side thereof, a power shaft disposed on each side of said bracket in said bearing lugs and provided with a series of gears, a plurality of odometers disposed within the casing, on each side of said bracket, the shafts of the odometers being parallel and at right angles to the power shafts and a gear wheel carried by the shaft of each odometer and arranged to engage its corresponding gear on each of the power shafts, an H-shaped bracket secured to the interior of said U-shaped bracket, a pair of stub shafts mounted for revolution on said H-shaped bracket, each of said stub shafts being provided at each end with a gear, a drive shaft arranged to engage one of the gears on each stub shaft, a gear carried by each of said power shafts and arranged to engage one of the gears on said stub shafts.

3. An instrument of the class described, comprising a casing, two series of odometers arranged side by side in the casing, and a common operating mechanism for both series of odometers and each series of odometers consisting of a number of them extending in a row at right angles to the odometer axes.

4. An instrument of the class described, comprising a casing, two series of odometers arranged side by side in the casing, and a common operating mechanism for both series of odometers, including gearing situated between the two series of odometers and each series of odometers consisting of a number of them extending in a row at right angles to the odometer axes.

5. An instrument of the class described, comprising a casing, two series of odometers arranged side by side in the casing, a frame member extending between the two series of odometers, and supporting them at their inner ends, and a common operating mechanism for both series of odometers, including gearing situated between the two series of odometers and each series of odometers consisting of a number of them extending in a row at right angles to the odometer axes.

6. A meter comprising a cylindrical casing, a frame member extending diametrically across said casing, two power shafts parallel with said member and supported in bearings thereon, each shaft having a series of power-transmitting members, and a plurality of odometers on each side of said frame member, and within the casings each odometer having a gear whose axis is at right angles to the power shaft, meshing with a power shaft power-transmitting member.

MARVIN SMITHEY.